United States Patent
Yoshimura et al.

(10) Patent No.: US 6,534,589 B1
(45) Date of Patent: *Mar. 18, 2003

(54) PROCESS FOR PRODUCING A RESIN HAVING A LARGE REFRACTIVE INDEX

(75) Inventors: Yuichi Yoshimura, Chiba-ken (JP); Motoharu Takeuchi, Tokyo (JP); Atsuki Niimi, Tokyo (JP); Hiroshi Horikoshi, Chiba-ken (JP); Masaaki Takasuka, Chiba-ken (JP)

(73) Assignee: Mitsubishi Gas Chemical Company Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,762

(22) Filed: Nov. 30, 1999

(30) Foreign Application Priority Data

Dec. 1, 1998 (JP) ............................................. 10-341927
Dec. 25, 1998 (JP) ............................................. 10-370222

(51) Int. Cl.⁷ ........................... C08L 81/00; C08K 5/13; G02B 1/04
(52) U.S. Cl. .................... 524/765; 528/378; 528/380
(58) Field of Search .................. 528/378, 380; 524/765

(56) References Cited

U.S. PATENT DOCUMENTS

| | | | |
|---|---|---|---|
| 2,304,466 A | * 12/1942 | Matheson | |
| 3,345,308 A | 10/1967 | Akron | |
| 3,409,565 A | 11/1968 | Akron | |
| 3,651,031 A | 3/1972 | Boucheron | |
| 4,560,579 A | * 12/1985 | Siadat | |
| 5,767,212 A | * 6/1998 | Iguchi | |
| 6,180,753 B1 | * 1/2001 | Amagai | |

FOREIGN PATENT DOCUMENTS

| | | |
|---|---|---|
| DE | 1814639 | 7/1969 |
| EP | 0785194 | 7/1997 |
| EP | 874016 | * 10/1998 |
| EP | 0921417 | 6/1999 |
| EP | 0936233 | 8/1999 |
| FR | 1446901 | 11/1966 |

OTHER PUBLICATIONS

Kameyama "New Synthesis of Poly(S–thioesters)" Macromolecules 30(21) pp. 6494–6497; Oct. 1997.*
Kameyama "New Acyl Group Transfer Polymerization" Polymer Journal 28(1) pp. 68–75, 1996.*
Kuran W., et al., "Copolymerisation of carbon dioxide and propylene suphide", vol. 179, 1978, pp. 2545–2548.

* cited by examiner

Primary Examiner—David J. Buttner
(74) Attorney, Agent, or Firm—Antonelli, Terry, Stout, & Kraus, LLP

(57) ABSTRACT

A process for producing a resin having a large refractive index which comprises curing an episulfide compound having one or more epithio structures represented by formula (1) in one molecule by polymerization in the presence of a polymerization catalyst and 0.001 to 3.0 parts by weight of a phenol derivative per 100 parts by weight of the episulfide compound.

Formula (1)

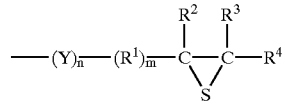

($R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S, O, Se or Te and m and n each represents 0 or 1).

18 Claims, No Drawings

PROCESS FOR PRODUCING A RESIN HAVING A LARGE REFRACTIVE INDEX

BACKGROUND OF THE INVENTION

1. Field of the Invention

The present invention relates to a process for producing optical materials such as plastic lenses, prisms, optical fibers, information recording substrates and filters, and more particularly, to a process for producing plastic lenses of glasses.

2. Description of the Related Arts

Plastic materials have widely been used for various optical materials, particularly as lenses of glasses, ecaus 1 eight, toughness and easiness of tinting. The properties required for optical materials, particularly for lenses of glasses, are a low specific gravity, excellent transparency, suppressed yellow color and optical properties which are a large refractive index and a large Abbe number. A large refractive index is important to decrease the thickness of a lens. A large Abbe number is important to decrease chromatic aberration of a lens. The present inventors have discovered novel episulfide compounds which can provide optical materials having a small thickness and a small chromatic aberration, i.e., a refractive index of 1.7 or larger and an Abbe number of 35 or larger, as disclosed in the specifications of Japanese Patent Application Laid-Open Nos. Heisei 9(1997)-71580, Heisei 9(1997)-110979 and Heisei 9(1997)-255781. The optical materials obtained in accordance with these inventions can provide sufficient quality in appearance when the optical materials are used for ordinary plastic lenses. However, plastic lenses may be used in very hot conditions or exposed to light for a very long time. Therefore, it is desired that optical materials have more improved properties such as more improved oxidation resistance and light resistance. Moreover, it is almost needless to mention that a resin having more colorless and transparent appearance is preferable when the resin is used as an optical materials such as a material for optical lenses.

SUMMARY OF THE INVENTION

An object of the present invention is to solve the above problems and to provide a process for producing a resin having a large refractive index which exhibits more improved light resistance, oxidation resistance, transparency and color tone than those achieved in accordance with conventional technologies using an episulfide compound having an epithio structure represented by formula (1) or a composition comprising the episulfide compound as the material.

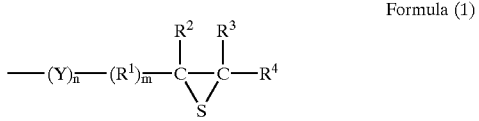

Formula (1)

($R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S, O, Se or Te and m and n each represents 0 or 1.)

As the result of intensive studies by the present inventors to produce a resin having a large refractive index which exhibits excellent light resistance, oxidation resistance, transparency and color tone from an episulfide compound having epithio structures represented by formula (1) or a composition comprising the episulfide compound, it was found that a resin having a large refractive index which exhibits excellent light resistance and oxidation resistance can be obtained by curing an episulfide compound having epithio structures represented by formula (1) or a composition comprising the episulfide compound by polymerization in the presence of a phenol derivative. It was also found that a resin having a large refractive index which exhibits excellent light resistance and oxidation resistance can be obtained by using at least one polymerization catalyst selected from the group consisting of quaternary ammonium salts, quaternary phosphonium salts, tertiary sulfonium salt and secondary iodonium salts as the polymerization catalyst. The present invention has been completed on the basis of the above knowledge.

The present invention provides:

A process for producing a resin having a large refractive index which comprises curing an episulfide compound having one or more epithio structures represented by formula (1) in one molecule or a composition comprising 10% by weight or more of the episulfide compound by polymerization in the presence of a polymerization catalyst and 0.001 to 3.0 parts by weight of a phenol derivative per 100 parts by weight of the episulfide compound or the composition, respectively; and A process for producing a resin having a large refractive index which comprises curing an episulfide compound having one or more epithio structures represented by formula (1) in one molecule or a composition comprising 10% by weight of the episulfide compound by polymerization in the presence of 0.001 to 3.0 parts by weight of at least one polymerization catalyst selected from the group consisting of quaternary ammonium salts, quaternary phosphonium salts, tertiary sulfonium salts and secondary iodonium salts per 100 parts by weight of the episulfide compound or the composition, respectively.

DESCRIPTION OF THE PREFERRED EMBODIMENTS

The episulfide compound is used in the present invention so that the prepared optical material exhibits a large refractive index and a large Abbe number in an excellent balance. Therefore, it is preferable that $R^1$ in formula (1) represents methylene group or ethylene group and $R^2$, $R^3$ and $R^4$ each represents hydrogen atom or methyl group. It is more preferable that $R^1$ represents methylene group and $R^2$, $R^3$ and $R^4$ each represents hydrogen atom. n represents 0 or 1 and preferably 1. Y may represent either S or O. When a large refractive index is more important, it is preferable that Y represents S.

Among the above compounds having episulfide structures represented by formula (1) used in the present invention, compounds having two or more structures represented by formula (1) are preferable. Specific examples of the compound having the structure represented by formula (1) include the following compounds (A) to (E):

(A) Organic compounds having epithio groups excluding organic compounds (B) to (C) listed in the following
(B) Organic compounds having epithioalkyloxy groups
(C) Organic compounds having epithioalkylthio groups
(D) Organic compounds having epithioalkylseleno groups
(E) Organic compounds having epithioalkyltelluro groups
Organic compounds (A), (B), (C), (D) and (E) have a chain backbone structure, an alicyclic backbone structure, an aromatic backbone structure or a heterocyclic backbone structure having nitrogen atom, oxygen atom, sulfur atom, selenium atom or tellurium atom. The organic compounds may have a combination of epithio group, epithioalkyloxy groups, epithioalkylthio groups, epithioalkylseleno group and epithioalkyltelluro group in one molecule. The organic compound may also have sulfide linkages, selenide linkages, telluride linkages, ether linkages, sulfone linkages, ketone linkages, ester linkages, amide linkages or urethane linkages.

Preferable examples of the organic compound having epithio groups of compound (A) include compounds obtained by replacing one or more epoxy groups in compounds having epoxy groups (not glycidyl groups) with epithio groups. Specific examples of the above compound include:

Organic compounds having a chain aliphatic backbone structure such as 1,1-bis(epithioethyl)methane, 1-(epithioethyl)-1-(β-epithlopropyl)methane, 1,1-bis(β-epithiopropyl)methane, 1-(epithioethyl)-1-(β-epithiopropyl)ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithio-ethyl)-5-(β-epithiopropyl)hexane, 1-(epithioethyl)-2-(γ-epithiobutylthio)-ethane, 1-(epithioethyl)-2-[2-(γ-epithiobutylthio)ethylthio]ethane, tetrakis-(β-epithiopropyl)methane, 1,1,1-tris(β-epithiopropyl)propane, 1,3-bis(γ-epithiopropyl)-1-(β-epithiopropyl)-2-thiapropane and 1,5-bis(β-epithiopropyl)-2,4-bis(β-epithiopropyl)-3-thiapentane;

Compounds having an alicyclic backbone structure such as 1,3- and 1,4-bis(epithioethyl)cyclohexanes, 1,3- and 1,4-bis(β-epithiopropyl)cyclohexanes, bis[4-(epithioethyl)cyclohexyl]methane, bis[4-(β-epithiopropyl)cyclohexyl]methane, 2,2-bis[4-(epithioethyl)cyclohexyl]-propane, 2,2-bis[4-(β-epithiopropyl)cyclohexyl]propane, bis[4-(β-epithiopropyl)cyclohexyl]sulfide, bis[4-(epithioethyl)cyclohexyl]sulfide, 2,5-bis(epithioethyl)-1,4-dithiane, 2,5-bis(β-epithiopropyl)-1,4-dithiane, 4-epithioethyl-1,2-cyclohexene sulfide and 4-epoxy-1,2-cyclohexene sulfide;

Compounds having an aromatic backbone structure such as 1,3- and 1,4-bis(epithioethyl)benzenes, 1,3- and 1,4-bis(β-epithiopropyl)benzenes, bis[4-(epithioethyl)phenyl]methane, bis[4-(β-epithiopropyl)phenyl]methane, 2,2-bis[4-(epithioethyl)phenyl]propane, 2,2-bis[4-(β-epithiopropyl)phenyl]propane, bis[4-(epithioethyl)phenyl]sulfide, bis[4-(β-epithiopropyl)phenyl]sulfide, bis[4-(epithioethyl)phenyl]sulfone, bis[4-(β-epithiopropyl)phenyl]sulfone, 4,4'-bis(epithioethyl)biphenyl and the like compounds and 4,4'-bis(β-epithiopropyl)biphenyl and the like compounds; and Compounds obtained by replacing at least one hydrogen atom of the epithio group with methyl group.

Preferable examples of the organic compound having one or more epithioalkyloxy groups of compound (B) include compounds obtained by replacing one or more glycidyl groups in epoxy compounds derived from an epihalohydrin with epithioalkyloxy groups (thioglycidyl groups). Specific examples of the above epoxy compound include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecanedicarboxylic acid, dimer acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary diamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,6- and 2,6-naphthalenediamines, 4,4'-diaminodiphenylmethane, 4,4'-diaminodiphenyl ether and 2,2-(4,4'-diaminodiphenyl)propane; epoxy compounds derived from amines which are produced by condensation of epihalohydrins with secondary diamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)butane; and epoxy compounds of urethane produced from the above polyhydric alcohols, the above phenols, diisocyanates and glycidol.

More specific examples of compound (B) include:

Compounds having a chain aliphatic backbone structure such as bis(β-epithiopropyl)ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β- epithiopropyloxyethyl)oxyethyl]oxy]ethane, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis((β-epithiopropyloxy)-2,4,5-tris(β-epithiopropyloxymethyl)-3,6-dithiaoctane , 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl)oxymethyl]-3,7-dithianonane, 1,10-bis(β-epithiopropyloxy)-5,6-bis[(2-β-epithiopropyloxyethyl)oxyl-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane and 1,11-bis(β-epithiopropyloxy)-4,7-bis(β-epithiopropyloxymethyl)-3,6,9-trithiaundecane;

Compounds having an alicyclic backbone structure such as 1,3- and 1,4-bis(β-epithiopropyloxy)cyclohexanes, 1,3- and 1,4-bis(β-epithiopropyloxymethyl)cyclohexanes, bis[4-(β-epithiopropyloxy)cyclohexyl]methane, 2,2-bis[4-(β-epithiopropyloxy)cyclohexyl]propane, bis[4-(β-epithiopropyloxy)cyclohexyl]sulfide, 2,5-bis(β-epithiopropyloxymethyl)-1,4-dithiane and 2,5-bis(β-epithiopropyloxyethyloxymethyl)-1,4-dithiane;

Compounds having an aromatic backbone structure such as 1,3- and 1,4-bis(β-epithiopropyloxy)benzenes, 1,3- and 1,4-bis(β-epithiopropyloxymethyl)benzenes, bis[4-(β-epithiopropyloxy)phenyl]methane, 2,2-bis[4-(β-epithiopropyloxy)phenyl]propane, bis[4-((β-epithiopropyloxy)phenyl]sulfide, bis[4-(β-epithiopropyloxy)phenyl]sulfone and 4,4'-bis(β-epithiopropyloxy)biphenyl; and Compounds obtained by replacing at least one hydrogen atom in the epithio group of the above compounds with methyl group.

Preferable examples of the organic compound having one or more epithioalkylthio groups of compound (C) include compounds obtained by replacing one or more epoxyalkylthio groups (specifically, β-epoxypropylthio groups) in epoxy compounds derived from a compound having mercapto group and an epihalohydrin with epithioalkylthio groups. Specific examples of the above compound include:

Organic compounds having a chain aliphatic backbone structure such as bis(β-epithiopropyl)sulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)-butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane; tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane and 1,11-bis(β-epithiopropylthio)-4,7-bis(β-epithiopropylthiomethyl)-3,6,9-trithiaundecane;

Chain compounds having an ester group and an epithioalkylthio group such as tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane and 1,1,1-tri[2-(β-epithiopropylthiomethyl)acetylmethyl]propane;

Compounds having an alicyclic backbone structure such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithiane and 2,5-bis(β-epithiopropylthioethylthiomethyl)-1,4-dithiane;

Compounds having an aromatic backbone structure such as 1,3- and 1,4-bis((β-epithiopropylthio)benzenes, 1,3- and 1,4-bis((β-epithiopropylthiomethyl)benzenes, bis[4-(β-epithiopropylthio)phenyl]methane, 2,2-bis[4-(β-epithiopropylthio)phenyl]propane, bis[4-(β-epithiopropylthio)phenyl]sulfide, bis[4-((β-epithiopropylthio)phenyl]sulfone and 4,4'-bis(β-epithiopropylthio)biphenyl; and Compounds obtained by replacing at least one hydrogen atom in the epithio group of the above compounds with methyl group.

Preferable examples of the organic compound having epithioalkylseleno group of compound (D) include compounds obtained by replacing one or more epoxyalkylseleno groups (specifically, β-epoxypropylseleno groups) in epoxy compounds derived from an epihalohydrin and selenium metal or a selenium compound such as an alkali metal selenide, an alkali metal selenol, an alkyl (aryl) selenol and hydrogen selenide with epithioalkylseleno groups. Specific examples of the above compound include:

Organic compounds having a chain aliphatic backbone structure such as bis(β-epithiopropyl)selenide, bis(β-epithiopropyl)diselenide, bis(β-epithiopropyl)triselenide, bis(β-epithiopropylseleno)methane, 1,2-bis(β- epithiopropylseleno)ethane, 1,3-bis(β-epithiopropylseleno) propane, 1,2-bis(β-epithiopropylseleno)propane, 1-(β-epithiopropylseleno)-2-(β-epithiopropylselenomethyl) propane, 1,4-bis(β-epithiopropylseleno)butane, 1,3-bis(β-epithiopropylseleno)butane, 1-(β-epithiopropylseleno)-3-(β-epithiopropylselenomethyl)butane, 1,5-bis(β-epithiopropylseleno)pentane, 1-(β-epithiopropylseleno)-4-(,-epithiopropylselenomethyl)pentane, 1,6-bis(β-epithiopropylseleno)hexane, 1-(β-epithiopropylseleno)-5-(β-epithiopropylselenomethyl)hexane, 1-(-epithiopropylseleno)-2-[(2-β-epithiopropylselenoethyl) thioethane, 1-(β-epithiopropylseleno)-2-[2-(2-β-epithiopropylselenoethyl)selenoethyl]thio]ethane, tetrakis-(β-epithiopropylselenomethyl)methane, 1,1,1-tris(β-epithiopropylselenomethyl)propane, 1,5-bis(β-epithiopropylseleno)-2-(β-epithiopropylselenomethyl)-3-thiapentane, 1,5-bis(β-epithiopropylseleno)-2,4-bis(β-epithiopropylselenomethyl)-3-thiapentane, 1-(β-epithiopropylseleno)-2,2-bis(β-epithiopropylselenomethyl)-4-thiahexane, 1,5,6-tris(β-epithiopropylseleno)-4-(β-epithiopropylselenomethyl)-3-thiahexane, 1,8-bis(β-epithiopropylseleno)-4-(β-epithiopropylselenomethyl)-3,6-dithiaoctane, 1,8-bis(β-epithiopropylseleno)-4,5-bis(β-epithiopropylselenomethyl)-3,6-dithiaoctane, 1,8-bis(β-epithiopropylseleno)-4,4-bis(β-epithiopropylselenomethyl)-3,6-dithiaoctane, 1,8-bis(β-epithiopropylseleno)-2,4,5-tris (β-epithiopropylselenomethyl)-3,6-dithiaoctane, 1,8-bis(β-epithiopropylseleno)-2,5-bis(β-epithiopropylselenomethyl)-3,6-dithiaoctane, 1,9-bis(β-epithiopropylseleno)-5-(β-epithiopropylselenomethyl)-5-[(2-β-epithiopropylselenoethyl)selenomethyl]-3,7-dithianonane, 1,10-bis(β-epithiopropylseleno)-5,6-bis[(2-β-epithiopropylselenoethyl)thio]-3,6,9-trithiadecane, 1,11-bis(β-epithiopropylseleno)-4,8-bis(β-epithiopropylselenomethyl)-3,6,9-trithiaundecane, 1,11-bis(β-epithiopropylseleno)-5,7-bis(β-epithiopropylselenomethyl)-3,6,9-trithiaundecane, 1,11-bis(β-epithiopropylseleno)-5,7-[(2-β-epithiopropylselenoethyl)selenomethyl]-3,6,9-trithiaundecane, 1,11-bis(β-epithiopropylseleno)-4,7-bis((β-epithiopropylselenomethyl)-3,6,9-trithiaundecane, tetra[2-(β-epithiopropylseleno)acetylmethyl]methane, 1,1,1-tri[2-(β-epithiopropylselenomethyl)methyl]propane, tetra[2-β-epithiopropylselenomethyl]acetylmethyl]methane, 1,1,1-tri [2-(β-epithiopropylselenomethyl)acetylmethyl]propane, bis (5,6-epithio-3-selenohexyl)selenide, 2,3-bis(6,7-thioepoxy-1-selena-4-selenoheptyl)-1-(3,4-thioepoxy-1-selenobutyl) propane, 1,1,3,3-tetrakis(4,5-thioepoxy-2-selenopentyl)-2-selenapropane, bis(4,5-thioepoxy-2-selenopentyl)-3,6,9-triselenaundecane-1,11-bis(3,4-thioepoxy-1-selenobutyl), 1,4-bis(3,4-thioepoxy-1-selenobutyl)-2,3-bis(6,7-thioepoxy-1-selena-4-selenoheptyl)butane, tris(4,5-thioepoxy-2-selenopentyl)-3-selena-6-thiaoctane-1,8-bis(3,4-thioepoxy-1-selenobutyl), bis(5,6-epithio-3-selenohexyl) telluride, 2,3-bis(6,7-thioepoxy-1-tellura-4-selenoheptyl)-1-(3,4-thioepoxy-1-selenobutyl)propane, 1,1,3,3-tetrakis(4,5-thioepoxy-2-selenopentyl)-2-tellurapropane, bis(4,5-thioepoxy-2-selenopentyl)-3,6,9-tritelluraundecane-1,1,1-bis(3,4-thioepoxy-1-selenobutyl), 1,4-bis(3,4-thioepoxy-1-selenobutyl)-2,3-bis(6,7-thioepoxy-1-tellura-4-selenoheptyl)butane and tris(4,5-thioepoxy-2-selenopentyl)-3-tellura-6-thiaoctane-1,8-bis(3,4-thioepoxy-1-selenobutyl);

Compounds having an alicyclic backbone structure such as 1,3- and 1,4-bis(β-epithiopropylseleno)cyclohexanes, 1,3- and 1,4-bis(β-epithiopropylselenomethyl) cyclohexanes, bis[4-(β-epithiopropylseleno)cyclohexyl] methane, 2,2-bis[4-(β-epithiopropylseleno)cyclohexyl] propane, bis[4-(β-epithiopropylseleno)cyclohexyl]sulfide, 2,5-bis(β-epithiopropylselenomethyl)-1,4-dithiane, 2,5-bis (β-epithiopropylselenoethylthiomethyl)-1,4-dithiane; 2,3-, 2,5- and 2,6-bis(3,4-epithio-1-selenobutyl)-1,4-diselenanes, 2,3-, 2,5- and 2,6-bis(4,5-epithio-2-selenopentyl)-1,4-diselenanes, 2,4-, 2,5- and 5,6-bis(3,4-epithio-1-selenobutyl)-1,3-diselenanes, 2,4-, 2,5- and 5,6-bis(4,5-epithio-2-selenopentyl)-1,3-diselenanes, 2,3-, 2,5-, 2,6- and 3,5-bis(3,4-epithio-1-selenobutyl)-1-thia-4-selenanes, 2,3-, 2,5-, 2,6- and 3,5-bis(4,5-epithio-2-selenopentyl)-1-thia-4-selenanes, 2,4- and 4,5-bis(3,4-epithio-1-selenobutyl)-1,3-diselenolanes, 2,4- and 4,5-bis(4,5-epithio-2-selenopentyl)-1,3-diselenolanes, 2,4-, 2,5- and 4,5-bis(3,4-epithio-1-selenobutyl)-1-thia-3-selenolanes, 2,4-, 2,5- and 4,5-bis(4,5-epithio-2-selenopentyl)-1-thia-3-selenolanes, 2,6-bis(4,5-epithio-2-selenopentyl)-1,3,5-triselenane, bis(3,4-epithio-1-selenobutyl)tricycloselenaoctane, bis(3,4-epithio-1-selenobutyl)dicycloselenanonane, 2,3-, 2,4-, 2,5 and 3,4-bis (3,4-epithio-1-selenobutyl)selenophanes, 2,3-, 2,4-, 2,5- and 3,4-bis(4,5-epithio-2-selenopentyl)selenophanes, 2-(4,5-thioepoxy-2-selenopentyl)-5-(3,4-thioepoxy-1-selenobutyl)-1-selenacyclohexane, 2,3-, 2,4-, 2,5-, 2,6-, 3,4-, 3,5- and 4,5-bis(3,4-thioepoxy-1-selenobutyl)-1-selenacyclohexanes, 2,3-, 2,4-, 2,5-, 2,6-, 3,4-, 3,5- and 4,5-bis(4,5-thioepoxy-2-selenopentyl)-1-selenacyclohexanes, 2,3-, 2,5- and 2,6-bis(3,4-epithio-1-selenobutyl)-1,4-ditelluranes, 2,3-, 2,5- and 2,6-bis(4,5-epithio-2-selenopentyl)-1,4-ditelluranes, 2,4-, 2,5- and 5,6-bis(3,4-epithio-1-selenobutyl)-1,3-ditelluranes, 2,4-, 2,5- and 5,6-bis(4,5-epithio-2-selenopentyl)-1,3-ditelluranes, 2,3-, 2,5-, 2,6- and 3,5-bis(3,4-epithio-1-selenobutyl)-1-thia-4-telluranes, 2,3-, 2,5-, 2,6- and 3,5-bis(4,5-epithio-2-selenopentylthia-4-telluranes, 2,4- and 4,5-bis(3,4-epithio-1-selenobutyl)-1,3-ditellurolanes, 2,4- and 4,5-bis(4,5-epithio-2-selenopentyl)-1,3-ditellurolanes, 2,4-, 2,5- and 4,5-bis(3,4-epithio-1-selenobutyl)-1-thia-3-tellurolanes, 2,4-, 2,5- and 4,5-bis(4,5-epithio-2-selenopentyl)-1-thia-3-tellurolanes, 2,6-bis(4,5-epithio-2-selenopentyl)-1,3,5-tritellurane, bis(3,4-epithio-1-selenobutyl) tricyclotelluraoctane, bis(3,4-epithio-1-selenobutyl) dicyclotelluranonane, 2,3-, 2,4-, 2,5- and 3,4-bis(3,4-epithio-1-selenobutyl)tellurophanes, 2,3-, 2,4-, 2,5- and 3,4-bis(4,5-epithio-2-selenopentyl)tellurophanes, 2-(4,5-thioepoxy-2-selenopentyl)-5-(3,4-thioepoxy-1-selenobutyl)-1-telluracyclohexane, 2,3-, 2,4-, 2,5-, 2,6-, 3,4-, 3,5- and 4,5-bis(3,4-thioepoxy-1-selenobutyl)-1-telluracyclohexanes and 2,3-, 2,4-, 2,5-, 2,6-, 3,4-, 3,5- and 4,5-bis(4,5-thioepoxy-2-selenopentyl)-1-telluracyclohexanes;

Compounds having an aromatic backbone structure such as 1,3- and 1,4-bis(β-epithiopropylseleno)benzenes, 1,3- and 1,4-bis(β-epithiopropylselenomethyl)benzenes, bis[4-(β-epithiopropylseleno)phenyl]methane, 2,2-bis[4-(β-epithiopropylseleno)phenyl]propane, bis[4-(β-epithiopropylseleno)phenyl]sulfide, bis[4-(β-epithiopropylseleno)phenyl]sulfone and 4,4'-bis(β-epithiopropylseleno)biphenyl; and Compounds obtained by replacing at least one hydrogen atom in the β-epithiopropyl group of the above compounds with methyl group.

Preferable examples of the organic compound having epithioalkyltelluro group of compound (E) include compounds obtained by replacing one or more epoxyalkyltelluro groups (specifically, β-epoxypropyltelluro groups) in epoxy compounds derived from an epihalohydrin and tellurium metal or a tellurium compound such as an alkali metal telluride, an alkali metal tellurol, an alkyl (aryl) tellurol and hydrogen telluride with epithioalkyltelluro groups. Specific examples of the above organic compound include:

Organic compounds having a chain aliphatic backbone structure such as bis(β-epithiopropyl)telluride, bis(β-epithiopropyl)ditelluride, bis(β-epithiopropyl)tritelluride, bis(β-epithiopropyltelluro)methane, 1,2-bis(β-epithiopropyltelluro)ethane, 1,3-bis(β-epithiopropyltelluro)propane, 1,2-bis(β-epithiopropyltelluro)propane, 1-(β-epithiopropyltelluro)-2-(β-epithiopropyltelluromethyl)propane, 1,4-bis(β-epithiopropyltelluro)butane, 1,3-bis(β-epithiopropyltelluro)butane, 1-(β-epithiopropyltelluro)-3-(β-epithiopropyltelluromethyl)butane, 1,5-bis(β-epithiopropyltelluro)pentane, 1-(β-epithiopropyltelluro)-4-(β-epithiopropyltelluromethyl)pentane, 1,6-bis(β-epithiopropyltelluro)hexane, 1-(β-epithiopropyltelluro)-5-(β-epithiopropyltelluromethyl)hexane, 1-(β-epithiopropyltelluro)-2-[(2-β-epithiopropyltelluroethyl)thio]ethane, 1-(β-epithiopropyltelluro)-2-[[2-(2-β-epithiopropyltelluroethyl)telluroethyl]thio]ethane, tetrakis-(β-epithiopropyltelluromethyl)methane, 1,1,1-tris(β-epithiopropyltelluromethyl)propane, 1,5-bis(β-epithiopropyltelluro)-2-(β-epithiopropyltelluromethyl)-3-thiapentane, 1,5-bis(β-epithiopropyltelluro)-2,4-bis(β-epithiopropyltelluromethyl)-3-thiapentane, 1-(β-epithiopropyltelluro)-2,2-bis(β-epithiopropyltelluromethyl)-4-thiahexane, 1,5,6-tris(β-epithiopropyltelluro)-4-(β-epithiopropyltelluromethyl)-3-thiahexane, 1,8-bis(β-epithiopropyltelluro)-4-(β-epithiopropyltelluromethyl)-3,6-dithiaoctane, 1,8-bis(β-epithiopropyltelluro)-4,5-bis(β-epithiopropyltelluromethyl)-3,6-dithiaoctane, 1,8-bis(β-epithiopropyltelluro)-4,4-bis(β-epithiopropyltelluromethyl)-3,6-dithiaoctane, 1,8-bis(β-epithiopropyltelluro)-2,4,5-tris(β-epithiopropyltelluromethyl)-3,6-dithiaoctane, 1,8-bis(β-epithiopropyltelluro)-2,5-bis(β-epithiopropyltelluromethyl)-3,6-dithiaoctane, 1,9-bis(β-epithiopropyltelluro)-5-(β-epithiopropyltelluromethyl)-5-[(2-β-epithiopropyltelluroethyl)selenomethyl]-3,7-dithianonane, 1,10-bis(β-epithiopropyltelluro)-5,6-bis[(2-β-epithiopropyltelluroethyl)thio]-3,6,9-trithiadecane, 1,11-bis(β-epithiopropyltelluro)-4,8-bis(β-epithiopropyltelluromethyl)-3,6,9-trithiaundecane, 1,11-bis(β-epithiopropyltelluro)-5,7-bis(β-epithiopropyltelluromethyl)-3,6,9-trithiaundecane, 1,11-bis(β-epithiopropyltelluro)-5,7-[(2-β-epithiopropyltelluroethyl)selenomethyl]-3,6,9-trithiaundecane, 1,11-bis(β-epithiopropyltelluro)-4,7-bis(β-epithiopropyltelluromethyl)-3,6,9-trithiaundecane, tetra[2-(β-epithiopropyltelluro)acetylmethyl]methane, 1,1,1-tri[2-(β-epithiopropyltelluro)acetylmethyl]propane, tetra [2-β-epithiopropyltelluromethyl]acetylmethyl]methane, 1,1,1-tri[2-(β-epithiopropyltelluromethyl)acetylmethyl]propane, bis(5,6-epithio-3-tellurohexyl)selenide, 2,3-bis(6,7-thioepoxy-1-selena-4-telluroheptyl)-1-(3,4-thioepoxy-1-tellurobutyl)propane, 1,1,3,3-tetrakis(4,5-thioepoxy-2-telluropentyl)-2-selenapropane, bis(4,5-thioepoxy-2-telluropentyl)-3,6,9-triselenaundecane-1,11-bis(3,4-thioepoxy-1-tellurobutyl), 1,4-bis(3,4-thioepoxy-1-tellurobutyl)-2,3-bis(6,7-thioepoxy-1-selena-4-telluroheptyl)butane, tris(4,5-thioepoxy-2-telluropentyl)-3-selena-6-thiaoctane-1,8-bis(3,4-thioepoxy-1-tellurobutyl), bis(5,6-epithio-3-tellurohexyl)telluride, 2,3-bis(6,7-thioepoxy-1-tellura-4-telluroheptyl)-1-(3,4-thioepoxy-1-tellurobutyl)propane, 1,1,3,3-tetrakis(4,5-thioepoxy-2-telluropentyl)-2-tellurapropane, bis(4,5-thioepoxy-2-telluropentyl)-3,6,9-tritelluraundecane-1,1,1- bis(3,4-thioepoxy-1-tellurobutyl), 1,4-bis(3,4-thioepoxy-1-tellurobutyl)-2,3-bis(6,7-thioepoxy-1-tellura-4-telluroheptyl)butane and tris(4,5-thioepoxy-2-telluropentyl)-3-tellura-6-thiaoctane-1,8-bis(3,4-thioepoxy-1-tellurobutyl);

Compounds having an alicyclic backbone structure such as 1,3- and 1,4-bis(β-epithiopropyltelluro)cyclohexanes, 1,3- and 1,4-bis(β-epithiopropyltelluromethyl)cyclohexanes, bis[4-(β-epithiopropyltelluro)cyclohexyl]methane, 2,2-bis[4-(β-epithiopropyltelluro)cyclohexyl]propane, bis[4-(β-epithiopropyltelluro)cyclohexyl]sulfide, 2,5-bis(β-epithiopropyltelluromethyl)-1,4-dithiane, 2,5-bis(β-epithiopropyltelluroethylthiomethyl)-1,4-dithiane; 2,3-, 2,5- and 2,6-bis(3,4-epithio-1-tellurobutyl)-1,4-diselenanes, 2,3-, 2,5- and 2,6-bis(4,5-epithio-2-telluropentyl)-1,4-diselenanes, 2,4-, 2,5- and 5,6-bis(3,4-epithio-1-tellurobutyl)-1,3-diselenanes, 2,4-, 2,5- and 5,6-bis(4,5-epithio-2-telluropentyl)-1,3-diselenanes, 2,3-, 2,5-, 2,6- and 3,5-bis(3,4-epithio-1-tellurobutyl)-1-thia-4-selenanes, 2,3-, 2,5-, 2,6- and 3,5-bis(4,5-epithio-2-telluropentyl)-1-thia-4-selenanes, 2,4- and 4,5-bis(3,4-epithio-1-tellurobutyl)-1,3-diselenolanes, 2,4- and 4,5-bis(4,5-epithio-2-telluropentyl)-1,3-diselenolanes, 2,4-, 2,5- and 4,5-bis(3,4-epithio-1-tellurobutyl)-1-thia-3-selenolanes, 2,4-, 2,5- and 4,5-bis(4,5-epithio-2-telluropentyl)-1-thia-3-selenolanes, 2,6-bis(4,5-epithio-2-telluropentyl-1,3,5-triselenane, bis(3,4-epithio-1-tellurobutyl)tricycloselenaoctane, bis(3,4-epithio-1-tellurobutyl)dicycloselenanonane, 2,3-, 2,4-, 2,5 and 3,4-bis(3,4-epithio-1-tellurobutyl)selenophanes, 2,3-, 2,4-, 2,5- and 3,4-bis(4,5-epithio-2-telluropentyl)selenophanes, 2-(4,5-thioeploxy-2-telluropentyl)-5-3,4-thioepoxy-1-tellurobutyl)-1-selenacyclohexane, 2,3-, 2,4-, 2,5-, 2,6-, 3,4-, 3,5- and 4,5-bis(3,4-thioepoxy-1-tellurobutyl)-1-selenacyclohexanes, 2,3-, 2,4-, 2,5-, 2,6-, 3,4-, 3,5- and 4,5-bis(4,5-thioepoxy-2-telluropentyl)-1-selenacyclohexanes, 2,3-, 2,5- and 2,6-bis(3,4-epithio-1-tellurobutyl)-1,4-ditelluranes, 2,3-, 2,5- and 2,6-bis(4,5-epithio-2-telluropentyl)-1,4-ditelluranes, 2,4-, 2,5- and 5,6-bis(3,4-epithio-1-tellurobutyl)-1,3-ditelluranes, 2,4-, 2,5- and 5,6-bis(4,5-epithio-2-telluropentyl)-1,3-ditelluranes, 2,3-, 2,5-, 2,6- and 3,5-bis(3,4-epithio-1-tellurobutyl)-1-thia-4-telluranes, 2,3-, 2,5-, 2,6- and 3,5-bis(4,5-epithio-2-telluropentyl)-1-thia-4-telluranes, 2,4- and 4,5-bis(3,4-epithio-1-tellurobutyl)-1,3-ditellurolanes, 2,4- and 4,5-bis(4,5-epithio-2-telluropentyl)-1,3-ditellurolanes, 2,4-, 2,5- and 4,5-bis(3,4-epithio-1-tellurobutyl)-1-thia-3-tellurolanes, 2,4-, 2,5- and 4,5-bis(4,5-epithio-2-telluropentyl)-1-thia-3-tellurolanes, 2,6-bis(4,5-epithio-2-telluropentyl)-1,3,5-tritellurane, bis(3,4-epithio-1-tellurobutyl)tricyclotelluraoctane, bis(3,4-epithio-1-tellurobutyl)dicyclotelluranonane, 2,3-, 2,4-, 2,5- and 3,4-bis(3,4-epithio-1-tellurobutyl)tellurophanes, 2,3-, 2,4-, 2,5- and 3,4-bis(4,5-epithio-2-telluropentyl)tellurophanes, 2-(4,5-thioepoxy-2-telluropentyl)-5-(3,4-thioepoxy-1-tellurobutyl)-1-telluracyclohexane, 2,3-, 2,4-, 2,5-, 2,6-, 3,4-, 3,5- and 4,5-bis(3,4-thioepoxy-1-tellurobutyl)-1-telluracyclohexanes and 2,3-, 2,4-, 2,5-, 2,6-, 3,4-, 3,5- and 4,5-bis(4,5-thioepoxy-2-telluropentyl)-1-telluracyclohexanes;

Compounds having an aromatic backbone structure such as 1,3- and 1,4-bis(β-epithiopropyltelluro)benzenes, 1,3- and 1,4-bis(β-epithiopropyltelluromethyl)benzenes, bis[4-(β-epithiopropyltelluro)phenyl]methane, 2,2-bis[4-(β-epithiopropyltelluro)phenyl]propane, bis[4-((β-epithiopropyltelluro)phenyl]sulfide, bis[4-(β-epithiopropyltelluro)phenyl]sulfone and 4,4'-bis(β-epithiopropyltelluro)biphenyl; and Compounds obtained by replacing at least one hydrogen atom in the β-epithiopropyl group of the above compounds with methyl group.

Further examples of compounds (A) to (E) include organic compounds having unsaturated groups. Specific examples of such compounds include vinylphenyl thioglycidyl ether, vinylbenzyl thioglycidyl ether, thioglycidyl methacrylate, thioglycidyl acrylate and allyl thioglycidyl ether.

Further examples of the compounds having epithio group include compounds such as ethylene sulfide, propylene sulfide and thioglycidol; thioglycidyl esters of monocarboxylic acids such as acetic acid, propionic acid and benzoic acid; and thioglycidyl ethers such as methyl thioglycidyl ether, ethyl thioglycidyl ether, propyl thioglycidyl ether and butyl thioglycidyl ether.

Among the above compounds, the organic compounds having epithioalkyloxy groups of compound (B), the organic compounds having epithioalkylthio groups of compound (C), the organic compounds having epithioalkylseleno groups of compound (D) and the organic compounds having epithioalkyltelluro groups of compound (E) are preferable for optical materials. The compounds having epithioalkylthio groups of compound (C) and the compounds having epithioalkylseleno groups of compound (D) are more preferable. Examples of still more preferable compounds include chain compounds, branched compounds, alicyclic compounds and aromatic compounds having β-epithioalkylthio groups or β-epithioseleno groups which are described above as the examples. Among these compounds, bis(β-epithiopropyl)sulfide is most preferable.

In the present invention, phenol derivatives are the compounds which exhibit the excellent effects of improving oxidation resistance and light resistance by addition in advance to the compound having one or more epithio structures represented by formula (1) in one molecule or the composition comprising 10% by weight or more of this compound when the compound or the composition is cured by polymerization to prepare a resin having a large refractive index. When compounds which are generally used as effective antioxidants for resins but are not phenol derivatives, for example, phosphite compounds such as trinonyl phosphite, sulfur compounds such as dialkyl thiodipropionates and amine compounds such as alkylated diphenylamines are added, the excellent effect of improving oxidation resistance and light resistance of the resin having a large refractive index as the object of the present invention is not exhibited. Among phenol derivatives, compounds having a molecular weight greater than 1,000 exhibit a poor effect of improving oxidation resistance and light resistance.

A monohydric phenol or a polyhydric phenol can be used as the phenol derivative in the present invention.

Examples of the monohydric phenol include phenol; phenols substituted with alkyl groups such as 2-ethylphenol, 4-ethylphenol, 4-propylphenol, 4-butylphenol, 4-(1,1,3,3-tetramethylbutyl)phenol, 4-nonylphenol, 2,4-di-t-butylphenol, 2,6-di-t-butylphenol, 2-t-butyl-4-methylphenol, 2-t-butyl-4,6-dimethylphenol, 2,6-di-t-butyl-4-methylphenol, 2,6-di-t-butyl-4-ethylphenol, 2-ethylphenol, 4-ethylphenol, 4-propylphenol, 4-butylphenol, 4-(1,1,3,3-tetramethylbutyl)phenol, 4-nonylphenol, 2,4-di-t-butylphenol, 2,6-di-t-butylphenol, 2-t-butyl-4-methylphenol, 2-t-butyl-4,6-dimethylphenol, 2,6-di-t-butyl-4-methylphenol, 2,6-di-t-butyl-4-ethylphenol, 4-propylphenol, 2-methoxyphenol, 4-methoxyphenol, 2,4-dimethoxyphenol, 2,6-dimethoxyphenol, 2,4,6-trimethoxyphenol, 2-t-butyl-4-methoxyphenol, 3-t-butyl-4-methoxyphenol, 2-cresol and 3-cresol, 4-cresol;

Phenols substituted with a halogen such as 2-fluorophenol, 4-fluorophenol, 2-chlorophenol, 4-chlorophenol, 2,4-dichlorophenol, 2,6-dichlorophenol, 2,4,6-trichlorophenol, 2-bromophenol, 4-bromophenol, 2,4-dibromophenol, 2,6-dibromophenol, 2,4,6-tribromophenol, 2-iodophenol and 4-iodophenol; and Other phenols such as salicylic acid, methyl salicylate, ethyl salicylate, propyl salicylate, butyl salicylate, octyl salicylate, phenyl salicylate, benzyl salicylate, dimethylsalicylic acid, di-t-butylsalicylic acid, salicylosalicylic acid, salicylamide, sodium salicylate, 5-sulfosalicylic acid, 4-hydroxy-3-methylbenzenesulfonic acid, 4-hydroxybenzoic acid, methyl 4-hydroxybenzoate, ethyl 4-hydroxybenzoate, propyl 4-hydroxybenzoate, butyl 4-hydroxybenzoate, phenyl 4-hydroxybenzoate, benzyl 4-hydroxybenzoate, 2,4-dihydroxybenzophenone, 2-hydroxy-4-methoxybenzophenone, 2-hydroxy-4-ethoxybenzophenone, 2-hydroxy-4-octoxybenzophenone, hydroxyphenylacetic acid, hydroxyphenylpropionic acid, hydroxyphenylacetamide, methyl hydroxyphenylacetate, hydroxyphenetyl alcohol, hydroxyphenetylamine, acetaminophenone, aminophenol, cyanophenol, nitrophenol, nitrosophenol, 2-mercaptophenol, 4-mercaptophenol, 2,4-dimercaptophenol, 2,6-dimercaptophenol, 2,4,6-trimercaptophenol, hydroxyphenetylamine, hydroxybenzaldehyde, 2-phenylphenol, 3-phenylphenol, 4-phenylphenol, 2-t-butyl-6-(3'-t-butyl-5'-methyl-2'-hydroxybenzyl)-4-methylphenyl acrylate and 2,4-bis(n-octylthio)-6-(4-hydroxy-3,5-di-t-butylanilino)-1,3,5-triazine.

Examples of the polyhydric phenol include catechol, substituted catechols such as catechol-4-carboxylic acid, 4-methylcatechol, 4-ethylcatechol, 4-t-butylcatechol, 4-(1,1,3,3-tetramethylbutyl)catechol, 3-methoxycatechol, 4-methoxycatechol, 3,5-dimethoxycatechol and 3,6-dimethoxycatechol, resorcinol, hydroquinone, phloroglucinol, pyrogallol, methylhydroquinone, 2-t-butylhydroquinone, 2,5-di-t-butylhydroquinone, 2,6-di-t-butylhydroquinone, 2,5-di-t-amylhydroquinone, 2,5-di(1,1,3,3-tetramethylbutyl)hydroquinone, 2,2'-biphenol, 4,4'-biphenol, bisphenol-A, bisphenol-F, bisphenol-S, bis(3,5-dimethyl-4-hydroxyphenyl)sulfone, bis(4-hydroxyphenyl)sulfide, bis(3,5-dimethyl-4-hydroxyphenyl)sulfide, 1-naphthol, 2-naphthol, dihydroxynaphthalenes, octadecyl-3-(3,5-di-t-butyl-4-hydroxyphenyl)propionate, 2,2'-methylenebis(4-methyl-6-t-butylphenol), 2,2'-methylenebis(4-ethyl-6-t-butylphenol), 2,2'-methylenebis(2,6-di-t-butylphenol), 4,4'-butylidenebis(3-methyl-6-t-butylphenol), 4,4'-thiobis(3-methyl-6-t-butylphenol), 1,1,3-tris(2-methyl-4-hydroxy-5-t-butylphenyl)butane and 1,3,5-trimethyl-2,4,6-tris(3,5-di-t-butyl-4-hydroxybenzyl)benzene. A single type or a mixture of two or more types of the above phenol derivatives may be used.

The molecular weight of the phenol derivative used in the present invention is preferably 1,000 or smaller, more preferably 500 or smaller, still more preferably 300 or smaller and most preferably 200 or smaller.

The amount of the phenol derivative is 0.001 to 3.0 parts by weight and preferably 0.002 to 2.0 parts by weight per 100 parts by weight of the episulfide compound having one or more epithio structures represented by formula (1) in one molecule or the composition comprising 10% by weight or more of the episulfide compound.

Examples of the curing catalyst used for producing an optical material in accordance with the process of the present invention include amines, phosphines, quaternary ammonium salts, quaternary phosphonium salts, tertiary sulfonium salts, secondary iodonium salts, mineral acids, Lewis acids, organic acids, silicic acids and tetrafluoroboric acid. Specific examples of the curing catalysts are as follows:

(1) Primary monoamines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexyl amine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3- butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl)ether, 1,2-bis-(3-aminopropoxy)ethane, 1,3-bis-(3-aminopropoxy)-2,2'-dimethylpropane, aminoethylethanolamine, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, 2- and 4-aminopiperidines, 2- and 4-aminomethylpiperidines, 2- and 4-aminoethylpiperidines, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- and p-phenylenediamines, 2,4- and 2,6-tolylenediamines, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamines, 1,5- and 2,6-naphthalenediamines, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine and bis(3,4-diaminophenyl)sulfone; secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl) amine, methylhexylamine, diallylamine, pyrrolidine, piperidine, 2-, 3- and 4-picolines, 2,4-, 2,6- and 3,5-lupetidines, diphenylamine, N-methylaniline, N-ethylaniline, dibenzylamine, methylbenzylamine, dinaphthylamine, pyrrol, indoline, indole and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethylpiperadines, homopiperadine, 1,1-di(4-piperidyl)methane, 1,2-di(4-piperidyl)ethane, 1,3-di(4-piperidyl)propane, 1,4-di(4-piperidyl)butane and tetramethylguanidine; tertiary amines such as trimethylamine, triethylamine, tri-n-propylamine, triisopropylamine, tri-1,2-dimethylpropylamine, tri-3-methoxypropylamine, tri-n-butylamine, triisobutylamine, tri-sec-butylamine, tri-n-pentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2(2-dimethylaminoethoxy)-4-methyl-1,3,2-dioxabornane; tertiary polyamines such as tetramethylethylenediamine, pyrazine, N,N'-dimethylpiperadine, N,N'-bis((2-hydroxy)propyl)piperadine, hexamethylenetetramine, N,N,N',N'-tetramethyl-1,3-butaneamine, 2-dimethylamino-2-hydroxypropane, diethyaminoethanol, N,N,N-tris(3-dimethylaminopropyl)amine, 2,4,6-tris(N,N,N-dimethylaminomethyl)phenol and heptamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl) methane, addition products of alkylimidazoles and isocyanuric acid and condensation products of alkylimidazoles and formaldehyde; and amidines such as 1,8-diazabicyclo-(5,4,0)undecene-7,1,5-diazabicyclo(4,3,0)nonene-5,6-dibutylamino-1,8-diazabicyclo(5,4,0)-undecene-7.

(2) Salts of the amines described above in (1) with borane or boron trifluoride.

(3) Phosphines such as trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris-(diethylamino)phosphine, tris(4-methylphenyl) phosphine, dimethylphenylphosphine, diethylphenylphosphine, dicyclohexyolphenylphosphine, ethyldiphenylphosphine, diphenylcyclohexylphosphine and chlorodiphenylphosphine;

(4) Quaternary ammonium salts such as tetramethylammonium chloride, tetramethylammonium bromide, tetraethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium para-toluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, methyltriphenylammonium chloride, methyltriphenylammonium bromide, ethyltriphenylammonium chloride, ethyltriphenylammonium bromide, n-butyltriphenylammonium chloride, n-butyltriphenylammonium bromide, 1-menthylpyridinium bromide, 1-ethylpyridinium bromide, 1-n-butylpyridinium bromide, 1-n-hexylpyridinium bromide, 1-n-octylpyridinium bromide, 1-n-dodecylpyridinium bromide, 1-n-phenylpyridinium bromide, 1-methylpicolinium bromide, 1-ethylpicolinium bromide, 1-n-butylpicolinium bromide, 1-n-hexylpicolinium bromide, 1-n-octylpicolinium bromide, 1-n-dodecylpicolinium bromide and 1-phenylpicolinium bromide.

(5) Quaternary phosphonium salts such as tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxymethylphosphonium bromide, tetrakishydroxyethylphosphonium chloride and tetrakishydroxybutylphosphonium chloride.

(6) Tertiary sulfonium salts such as trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide and triphenylsulfonium iodide.

(7) Secondary iodonium salts such as diphenyliodonium chloride, diphenyliodonium bromide and diphenyliodonium iodide.

(8) Mineral acids such as hydrochloric acid, sulfuric acid, nitric acid, phosphoric acid and carbonic acid. Half-esters of these mineral acids can also be used.

(9) Lewis acids such as boron trifluoride and boron trifluoride etherates.

(10) Organic acids and half-esters of organic acids.

(11) Silicic acids and tetrafluoroboric acid.

To enhance the effect of improving light resistance and oxidation resistance exhibited by the phenol derivative used in the present invention and also to improve transparency and color tone, the quaternary ammonium salts, the quaternary sulfonium salts, the tertiary sulfonium salts and the secondary iodonium salts are preferable among these compounds. The quaternary phosphonium salts and the tertiary sulfonium salts are more preferable and the quaternary phosphonium salts are most preferable. A single type or a mixture of two or more types of the above compounds may be used.

The amount of the polymerization catalyst is 0.001 to 3.0 parts by weight and preferably 0.005 to 2.0 parts by weight per 100 parts by weight of the episulfide compound having one or more epithio structures represented by formula (1) in one molecule or the composition comprising 10% by weight or more of the episulfide compound.

In the present invention, the composition comprising the episulfide compound having one or more epithio structures represented by formula (1) in one molecule comprises, in addition to the episulfide compound having one or more epithio structures represented by formula (1) in one molecule, a compound having one or more functional groups reactive with the epithio group in formula (1), a compound having one or more functional groups reactive with the epithio group and one or more other homopolymerizable functional groups, a compound having one or more homopolymerizable functional groups or a compound having one homopolymerizable functional group which is reactive with the epithio group. Specific examples of these compounds include corresponding compounds described as examples in the specification of Japanese Patent Application Laid-Open No. Heisei 9(1997)-255781.

It is preferable that a radical polymerization initiator is used to promote the polymerization when a compound having an unsaturated group is used. As the radical polymerization initiator, any compound which generates radical by heating or by irradiation of ultraviolet light or electron beams can be used. Specific examples of the radical polymerization initiator include corresponding compounds described as examples in the specification of Japanese Patent Application Laid-Open No. Heisei 9(1997)-255781.

It is possible that a compound having one or more SH groups is used as the antioxidation component alone or in combination with conventional antioxidants to provide the cured product with further improved oxidation resistance. Examples of the compound having one or more SH groups include mercaptans and thiophenols. Further examples include mercaptans and thiophenols having unsaturated groups such as vinyl group, aromatic vinyl groups, methacryl group, acryl group and allyl group. Specific examples of the compound having one or more SH groups include corresponding compounds described as examples in the specification of Japanese Patent Application Laid-Open No. Heisei 9(1997)-255781.

It is also possible that a compound having one or more active hydrogen atoms other than that of SH group is used to improve the properties such as the tint performance and strength. Examples of the active hydrogen atom include hydrogen atoms in hydroxyl group, carboxyl group and amide group and hydrogen atoms at the 2-position of 1,3-diketones, 1,3-dicarboxylic acids, esters of 1,3-dicarboxylic acids, 3-ketocarboxylic acids and esters of 3-ketocarboxylic acids. Examples of the compound having one or more active hydrogen atoms in one molecule include alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids, esters of 3-ketocarboxylic acids and compounds having unsaturated groups such as alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids and esters of 3-ketocarboxylic acids having vinyl group, aromatic vinyl groups, methacryl group, acryl group and allyl group. Specific examples of the compound having one or more active hydrogen atoms other than that of SH group include corresponding compounds described as examples in the specification of Japanese Patent Application Laid-Open No. Heisei 9(1997)-255781.

It is also possible that a compound having one or more isocyanate groups is used to improve strength. Specific examples of the compound having one or more isocyanate groups include corresponding compounds described as examples in the specification of Japanese Patent Application Laid-Open No. Heisei 10(1997)-028481.

In the present invention, when the composition comprising the episulfide compound having one or more epithio structures represented by formula (1) is prepared, the episulfide compound is used in an amount of 10% by weight or more, preferably 20% by weight or more and more preferably 30% by weight or more of the composition. When the amount is less than 10% by weight, the balance between the large refractive index and the large Abbe number cannot be maintained.

In the process for producing a resin having a large refractive index of the present invention, it is, of course, possible that conventional antioxidants and ultraviolet light absorbents are added to further improve the practical properties of the resin. The optical material produced in accordance with the process of the present invention tends to be cleaved from molds during polymerization. Therefore, it is effective that conventional external and/or internal adhesion improvers are used or added to control and improve adhesion between the obtained optical material and the mold.

In the process for producing a resin having a large refractive index of the present invention, the episulfide compound having one or more epithio structures represented by formula (1) in one molecule alone or the composition comprising the compound, the phenol derivative exhibiting the effect of improving oxidation resistance and light resistance described above, the catalyst and components used where necessary such as adhesion improvers, ultraviolet light absorbents, radical polymerization initiators and various agent for improving properties are mixed together to form a homogeneous mixture and the prepared mixture is cast into a mold made of glass or a metal, heated to allow the polymerization to proceed and removed from the mold to produce an optical material.

It is possible that, before the above mixture is prepared and cast into a mold, a preliminary polymerization of the entire amount or portions of the episulfide compound having one or more epithio structures represented by formula (1) alone or the composition comprising the episulfide compound is conducted at −100 to 160° C. for 0.1 to 72 hours in the presence or in the absence of a catalyst while being stirred or not stirred and then the mixture is prepared using the preliminarily polymerized compound or composition and cast into a mold. The preliminary polymerization is conducted preferably in the condition of −10 to 100° C. and 1 to 48 hours and more preferably of 0 to 60° C. and 1 to 48 hours.

The process for producing the resin for optical materials of the present invention is described more specifically in the following. The main materials and auxiliary materials are mixed together as described above and the obtained mixture is cast into a mold and cured. The episulfide compound having one or more epithio structures represented by formula (1) in one molecule alone or the composition comprising the episulfide compound, the phenol derivative exhibiting the effects of improving oxidation resistance and light resistance described above, the catalyst, the component used where desired, i.e., the compound having two or more functional groups reactive with the epithio group, the compound having one or more functional groups reactive with the epithio group: and one or more homopolymerizable functional groups, the compound having one or more homopolymerizable groups or the compound having one homopolymerizable functional group which is reactive with the epithio group, and other additives such as antioxidants, components for improving the tint performance and strength, adhesion improvers, stabilizers and radical polymerization initiators may be mixed together in one vessel at the same time in the entire amounts. Alternatively, the components may be added stepwise. Some components may also be mixed together separately in advance and the obtained mixtures may be mixed with other components in one vessel. The materials and auxiliary materials used may be mixed together in any desired order. The temperature and the time of mixing are not limited as long as the components can be sufficiently mixed together. However, an excessively high temperature and an excessively long time are not preferable because undesirable reactions take place between the components to increase viscosity and the operation of casting becomes difficult. The temperature of mixing should be in the range of about −50 to 100° C., preferably in the range of −30 to 50° C. and more preferably in the range of −5 to 30° C. The time of mixing is in the range of 1 minute to 5 hours, preferably in the range of 5 minutes to 2 hours, more preferably in the range of 5 to 30 minutes and most preferably in the range of about 5 to 15 minutes. It is preferable that degassing under vacuum is conducted before, during or after mixing the materials and the additives to prevent formation of bubbles during casting and curing in the mold. The pressure of the degassing is about 0.1 to 700 mmHg and preferably about 10 to 300 mmHg. To obtain a better quality of the resin for optical materials in the present invention, it is preferable that impurities are removed before the casting from the main material and the auxiliary materials by filtration using a filter having a pore diameter of 0.05 to 3 microns. After the mixture is cast into the mold made of glass or a metal, the curing by polymerization is conducted in an electric oven or the like. The curing time is 0.1 to 100 hours and generally 1 to 48 hours. The curing temperature is −10 to 160° C. and generally −10 to 140° C. The polymerization can be conducted by the steps of holding the temperature at a specific polymerization temperature for a specific period of time, raising the temperature at a speed of 0.1 to 100° C./hour and lowering the temperature at a speed of 0.1 to 100° C./hour or a combination of these steps. It is preferable that the material obtained after the curing is annealed at a temperature of 50 to 150° C. for about 10 minutes to 5 hours to remove strains from the prepared optical material of the present invention. Where necessary, the prepared material may have treatments of tinting, formation of hard coat, prevention of reflection and prevention of clouding of the material.

In accordance with the process of the present invention in which 0.001 to 3.0 parts by weight of the phenol derivative is added in advance to 100 parts by weight of the episulfide compound having one or more epithio structures represented by formula (1) in one molecule or the composition comprising 10% by weight or more of the episulfide compound and the obtained mixture is cured by polymerization, the resin having a large refractive index which exhibits more excellent oxidation resistance and light resistance than those obtained in accordance with conventional processes can be produced. Moreover, in accordance with the process of the present invention in which 0.001 to 3.0 parts by weight of the quaternary ammonium salt, the quaternary phosphonium salt, the tertiary sulfonium salt or the secondary iodonium salt is added as the catalyst and the obtained mixture is cured by polymerization, the resin having a large refractive index which exhibits more excellent transparency and color tone than those obtained in accordance with conventional processes can be produced.

EXAMPLES

The present invention will be described more specifically with reference to examples in the following. However, the present invention is not limited to the examples. The properties of the obtained lenses were evaluated in accordance with the following methods.

1. Refractive Index and Abbe Number (ND and vD)

The refractive index and the Abbe number were measured at 25° C. using an Abbe refractometer.

2. Degree of Yellow Color

Using a colorimeter, the δYI value of a lens having a thickness of 2.5 mm was measured. A material having a δYI value of 1.5 or less can be used as an optical material for lenses. However, the smaller the value of δYI, the more advantageous the material with respect to the degree of yellow color.

3. Oxidation Resistance

A lens having a thickness of 2.5 mm was heated at 130° C. for 3 hours in the atmosphere of the air and the increase in the value of δYI was measured after the heating. The smaller the increase in the value, the better the oxidation resistance.

4. Light Resistance

A lens having a thickness of 2.5 mm was irradiated by a light emitted from a burning carbon arc for 60 hours and the increase in the value of δYI was measured after the irradiation. The smaller the increase in the value, the better the light resistance.

5. Transparency

A lens having a thickness of 10 mm was irradiated by a light for a projector in a dark room and examined with respect to the turbidity. When the turbidity found in this observation is slight, the material can be used as an optical material. However, it is better that no turbidity is found.

| | |
|---|---|
| none: | no turbidity found |
| slight: | slight turbidity found |
| dense: | dense turbidity found |

Example 1

Into 95 parts by weight of bis(β-epithiopropyl)sulfide and 5 parts by weight of n-butyl thioglycolate, 0.1 part by weight of catechol as the antioxidant, 0.1 part by weight of tetrabutylammonium bromide as the catalyst and 0.1 part by weight of SUMISOLVE 340 (manufactured by SUMITOMO KAGAKU Co., Ltd.; 2-(2-hydroxy-5-t-octylphenyl)benzotriazole) as the ultraviolet absorbent were mixed and the mixture was stirred at the room temperature to prepare a homogeneous liquid. The prepared liquid was defoamed, filtered, cast into molds for flat lenses having a thickness of 2.5 mm and 10 mm and cured by polymerization in an oven heated in a manner such that the temperature was raised from 20 to 90° C. in 20 hours to prepare lenses. The obtained lenses showed excellent heat resistance and physical properties, excellent surface conditions and showed few striae and little deformation on the surface. The results of the evaluation of the refractive index, the Abbe number, the degree of yellow color, the oxidation resistance and the light resistance of the prepared lenses are shown in Table 2.

Examples 2 to 11

The same procedures as those conducted in Example 1 were conducted except that the compositions containing the episulfide compounds having epithio structures represented by formula (1), the antioxidants and the catalysts shown in Table 1 were used and lenses were prepared. The results of the evaluation of the refractive index, the Abbe number, the degree of yellow color, the oxidation resistance and the light resistance of the prepared lenses are shown in Table 2.

Example 12

The same procedures as those conducted in Example 1 were conducted except that pentaerythrytyl tetrakis(3-(3,5-di-t-butyl-4-hydroxyphenyl)propionate) was used as the antioxidant and lenses were prepared. The results of the evaluation of the refractive index, the Abbe number, the degree of yellow color, the oxidation resistance and the light resistance of the prepared lenses are shown in Table 2.

TABLE 1

| | Composition[1] (part by weight) | Phenol derivative[2] (part by weight) | Catalyst[3] (part by weight) |
|---|---|---|---|
| Example 1 | BEPS = 95, BTG = 5 | C = 0.1 | TBAB = 0.1 |
| Example 2 | BEPTE = 95, BTG = 5 | TBC = 0.1 | TEA = 0.1 |
| Example 3 | BEPTES = 95, BTG = 5 | TBC = 0.1 | TEA = 0.1 |
| Example 4 | BEPTE = 90, BMES = 5, HEMA = 5 | P = 0.1 | TBAB = 0.1 |
| Example 5 | BEPTE = 90, BMES = 5, HEMA = 5 | TCP = 0.1 | TBAB = 0.1 |

TABLE 1-continued

|   | Composition[1] (part by weight) | Phenol derivative[2] (part by weight) | Catalyst[3] (part by weight) |
|---|---|---|---|
| Example 6 | BEPS = 90, BMES = 5, PHPA = 5 | C = 0.1 | TBAB = 0.1 |
| Example 7 | BEPS = 90, BMES = 5, PHPA = 5 | C = 0.1 | TBPB = 0.1 |
| Example 8 | BEPS = 90, BMES = 5, PHPA = 5 | C = 0.005 | TBPB = 0.1 |
| Example 9 | BEPS = 90, BMES = 5, PHPA = 5 | C = 2.0 | TBPB = 0.1 |
| Example 10 | BEPS = 90, BMES = 5, PHPA = 5 | TBC = 0.1 | TBPB = 0.1 |
| Example 11 | BEPS = 20, BMES = 20, BGTPS = 60 | TBC = 0.1 | TEA = 0.1 |
| Example 12 | BEPS = 95, BTG = 5 | PTDTHP = 0.1 | TBAB = 0.1 |

[1]BEPS: bis(β-epithiopropyl) sulfide
BEPTE: bis(β-epithiopropylthio)ethane
BEPTES: bis(β-epithiopropylthioethyl) sulfide
BTG: n-butyl thioglycolate
BMES: bis(2-mercaptoethyl) sulfide
HEMA: 2-hydorxyethyl methacrylate
PHPA: 3-phenoxy-2-hydroxypropyl acrylate
BGTPS: bis(4-glydicylthiophenyl) sulfide
[2]C: catechol
TBC: t-butylcatechol
P: pyrogallol
TCP: 2,4,6-trichlovophenol
PTDTHP: pentaerythrityl tetrakis(3-(3,5-di-t-butyl-4-hydroxyphenyl) propionate)
[3]TBAB: tetrabutylammonium bromide
TEA: triethylamine
TBPB: tetrabutylphosphonium bromide

TABLE 2

|   | Refractive index | Abbe number | Degree of yellow color | Oxidation resistance | Light resistance | Turbidity |
|---|---|---|---|---|---|---|
| Example 1 | 1.71 | 36 | 0.7 | 0.4 | 0.5 | none |
| Example 2 | 1.71 | 36 | 0.8 | 0.4 | 0.6 | slight |
| Example 3 | 1.71 | 36 | 0.8 | 0.4 | 0.6 | slight |
| Example 4 | 1.70 | 36 | 0.7 | 0.3 | 0.5 | none |
| Example 5 | 1.70 | 36 | 0.7 | 0.3 | 0.5 | none |
| Example 6 | 1.70 | 36 | 0.7 | 0.3 | 0.5 | none |
| Example 7 | 1.70 | 36 | 0.6 | 0.2 | 0.4 | none |
| Example 8 | 1.70 | 36 | 0.6 | 0.3 | 0.5 | none |
| Example 9 | 1.70 | 36 | 0.7 | 0.2 | 0.4 | none |
| Example 10 | 1.70 | 36 | 0.6 | 0.2 | 0.4 | none |
| Example 11 | 1.70 | 30 | 0.7 | 0.4 | 0.5 | none |
| Example 12 | 1.70 | 36 | 0.7 | 0.5 | 0.7 | none |

Example 13

Into 100 parts by weight of bis(β-epithiopropylthio)ethane, 0.1 part by weight of tetrabutylammonium bromide as the catalyst was mixed and the mixture was stirred at the room temperature to prepare a homogeneous liquid. The prepared liquid was defoamed, filtered, cast into molds for flat lenses having a thickness of 2.5 mm and 10 mm and cured by polymerization in an oven heated in a manner such that the temperature was raised from 20 to 90° C. in 20 hours to prepare lenses. The obtained lenses showed excellent heat resistance and physical properties, excellent surface conditions and showed few striae and little deformation on the surface. The results of the evaluation of the refractive index, the Abbe number, the degree of yellow color and the turbidity of the prepared lenses are shown in Table 5.

Examples 14 to 25

The same procedures as those conducted in Example 13 were conducted except that the compositions containing the episulfide compounds having epithio structures represented by formula (1) and the catalysts shown in Table 3 were used and lenses were prepared. The results of the evaluation of the refractive index, the Abbe number, the degree of yellow color and the turbidity of the prepared lenses are shown in Table 5.

Comparative Example 1

The same procedures as those conducted in Example 13 were conducted except that 5 parts by weight of tetrabutylammonium bromide was used. The mixture turned into a gel during mixing and could not be cast into the molds.

Comparative Example 2

The same procedures as those conducted in Example 13 were conducted except that 0.0005 parts by weight of tetrabutylammonium bromide was used. The prepared lenses were yellow rubbery soft resins and the optical properties could not be measured.

Comparative Example 3

The same procedures as those conducted in Example 13 were conducted except that 0.1 part by weight of triethylamine was used in place of 0.1 part by weight of tetrabutylammonium bromide. As shown in Table 5, the obtained lenses was slightly turbid.

Comparative Examples 4 to 6

The same procedures as those conducted in Example 13 were conducted except that compositions containing the episulfide compounds having epithio structures represented by formula (1) and the catalysts shown in Table 4 were used and lenses were prepared. The results of the evaluation of the refractive index, the Abbe number, the degree of yellow color and the turbidity of the prepared lenses are shown in Table 5.

TABLE 3

|   | Composition (part by weight) | Catalyst (part by weight) |
|---|---|---|
| Example 13 | bis(β-epithiopropyl-thio)ethane = 100 | tetrabutylammonium bromide = 0.1 |
| Example 14 | bis(β-epithiopropyl)sulfide = 100 | tetrabutylammonium bromide = 0.1 |
| Example 15 | 2,5-bis(β-epithiopropylthiomethyl)-1,4-dithiane = 100 | tetrabutylammonium iodide = 0.01 |
| Example 16 | bis(β-epithiopropyl-thio)ethane = 95 n-butyl thioglycolate = 5 | tetrabutylammonium bromide = 0.1 |
| Example 17 | bis(β-epithiopropyl-thio)ethane = 95 n-butyl thioglycolate = 5 | tetrabutylphosphonium bromide = 0.05 |
| Example 18 | bis(β-epithiopropyl-thio)ethane = 90 bis(2-mercaptoethyl)sulfide = 5 2-hydroxyethyl methacrylate = 5 | tetrabutylammonium bromide = 0.1 |
| Example 19 | bis(β-epithiopropyl) sulfide = 95 2-mercaptoethanol = 5 | tetrabutylphosphonium bromide = 0.05 |
| Example 20 | bis(β-epithiopropyl)sulfide = 95 2-mercaptoethanol = 5 | tributlysulfonium iodide = 1.8 |

TABLE 3-continued

| | Composition (part by weight) | Catalyst (part by weight) |
|---|---|---|
| Example 21 | bis(β-epithiopropyl)sulfide = 93<br>n-butyl thioglycolate = 6<br>2-hydroxyethyl methacrylate = 1 | triethylbenzylammonium chloride = 0.1 |
| Example 22 | bis(β-epithiopropyl)sulfide = 90<br>bis(2-mercaptoethyl)sulfide = 5<br>3-phenoxy-2-hydroxypropyl acrylate = 5 | tetrabutylammonium bromide = 0.1 |
| Example 23 | bis(β-epithiopropyl)sulfide = 90<br>bis(2-mercaptoethyl)sulfide = 5<br>3-phenoxy-2-hydroxypropyl acrylate = 5 | tetrabutylphosphonium bromide = 0.05 |
| Example 24 | bis(β-epithiopropyl)sulfide = 20<br>bis(2-mercaptoethyl)sulfide = 20<br>bis(4-glycidylthiophenyl)sulfide = 60 | tetrabutylammonium bromide = 0.1 |
| Example 25 | 2,5-bis(β-epithiopropylthiomethyl)-1,4-dithiane = 95<br>2-mercaptoethanol = 5 | diphenyliodonium bromide = 0.25 |

TABLE 4

| | Composition (part by weight) | Catalyst (part by weight) |
|---|---|---|
| Comparative Example 1 | bis(β-epithiopropylthio)ethane = 100 | tetrabutylammonium bromide = 5 |
| Comparative Example 2 | bis(β-epithiopropylthio)ethane = 100 | tetrabutylammonium bromide = 0.0005 |
| Comparative Example 3 | bis(β-epithiopropylthio)ethane = 100 | triethylamine = 0.1 |
| Comparative Example 4 | bis(β-epithiopropylthio)ethane = 95<br>n-butyl thioglycolate = 5 | triphenylphosphine = 0.01 |
| Comparative Example 5 | bis(β-epithiopropyl)sulfide = 93<br>n-butyl thioglycolate = 6<br>2-hydroxyethyl methacrylate = 1 | piperidine = 1.0 |
| Comparative Example 6 | bis(β-epithiopropyl)sulfide = 8<br>bis(2-mercaptoethyl)sulfide = 7<br>bis(4-glycidylthiophenyl)sulfide = 85 | diethylcyclohexylamine = 0.5 |

TABLE 5

| | Refractive index | Abbe number | Degree of yellow color | Turbidity |
|---|---|---|---|---|
| Example 13 | 1.71 | 36 | 0.9 | none |
| Example 14 | 1.71 | 36 | 0.9 | none |
| Example 15 | 1.71 | 36 | 0.9 | none |
| Example 16 | 1.70 | 36 | 0.8 | none |
| Example 17 | 1.70 | 36 | 0.6 | none |
| Example 18 | 1.70 | 36 | 0.8 | none |
| Example 19 | 1.70 | 36 | 0.6 | none |
| Example 20 | 1.70 | 36 | 0.7 | none |
| Example 21 | 1.70 | 36 | 0.8 | none |
| Example 22 | 1.70 | 36 | 0.8 | none |
| Example 23 | 1.70 | 36 | 0.6 | none |
| Example 24 | 1.70 | 30 | 0.9 | none |
| Example 25 | 1.70 | 36 | 0.8 | none |
| Comparative Example 1 | gel formed during mixing | — | — | |
| Comparative Example 2 | soft lenses obtained | | 2.0 | dense |
| Comparative Example 3 | 1.71 | 36 | 0.9 | slight |
| Comparative Example 4 | 1.70 | 36 | 1.2 | slight |
| Comparative Example 5 | 1.70 | 36 | 1.0 | dense |
| Comparative Example 6 | 1.68 | 29 | 1.1 | slight |

What is claimed is:

1. A process for producing a resin having a large refractive index, which comprises curing by polymerization a composition comprising 10% by weight or more of an episulfide compound having one or more epithio structures in one molecule in the presence of a polymerization catalyst and 0.001 to 3.0 parts by weight of at least one phenol derivative per 100 parts by weight of the composition, the epithio structure being represented by the formula (1):

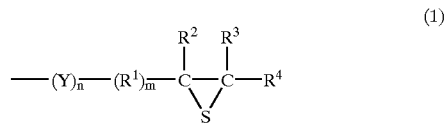

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S, O, Se or Te, and m and n each represents 0 or 1, and the at least one phenol derivative being selected from the group consisting of a polyhydric phenol and a halogenated phenol.

2. A process according to claim 1, wherein $R^1$ represents methylene group or ethylene group, and $R^2$, $R^3$ and $R^4$ each represents hydrogen atom or methyl group.

3. A process according to claim 1, wherein $R^1$ represents methylene group, and $R^2$, $R^3$ and $R^4$ each represents hydrogen atom.

4. A process according to claim 1, wherein said episulfide compound has at least two of said epithio structures.

5. A process according to claim 1, wherein n is 1.

6. A process according to claim 1, wherein Y represents S or Se.

7. A process according to claim 1, wherein said at least one phenol derivative has a molecular weight of 1,000 or less.

8. A process according to claim 1, wherein the at least one phenol derivative is a polyhydric phenol.

9. A process according to claim 8, wherein the polyhydric phenol is catechol, pyrogallol or catechol substituted with an alkyl group.

10. A process according to claim 1, wherein the at least one phenol derivative is a halogenated phenol.

11. A process according to claim 1, wherein the composition includes at least 20% by weight of said episulfide compound.

12. A process according to claim 1, wherein the composition includes at least 30% by weight of said episulfide compound.

13. A process for producing a resin having a large refractive index, which comprises curing by polymerization an episulfide compound having one or more epithio structures in one molecule in the presence of a polymerization catalyst and 0.001 to 3.0 parts by weight of at least one phenol derivative per 100 parts by weight of the episulfide compound, the epithio structure being represented by the formula (1):

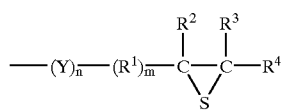

wherein $R^1$ represents a hydrocarbon group having 1 to 10 carbon atoms, $R^2$, $R^3$ and $R^4$ each represents hydrogen atom or a hydrocarbon group having 1 to 10 carbon atoms, Y represents S, O, Se or Te, and m and n each represents 0 to 1, and the at least one phenol derivative being selected from the group consisting of a polyhydric phenol and a halogenated phenol.

14. A process according to any one of claims 1 and 13, wherein the phenol derivative has a molecular weight of 200 or less.

15. A process according to any one of claims 1 and 13, wherein the polymerization catalyst is at least one polymerization catalyst selected from the group consisting of quaternary ammonium salts, quaternary phosphonium salts, tertiary sulfonium salts and secondary iodonium salts.

16. A process according to any one of claims 1 and 7, wherein the at least one phenol derivative is included in the composition in an amount of 0.002 to 2.0 parts by weight per 100 parts by weight of said episulfide compound.

17. A process according to claim 14, wherein the at least one phenol derivative is included in the composition in an amount of 0.002 to 2.0 parts by weight per 100 parts by weight of said episulfide compound.

18. A process according to any one of claims 1 and 13, wherein the at least one phenol derivative is initially mixed with the episulfide compound, forming a resulting mixture, and the resulting mixture is cured by polymerization.

* * * * *